Sept. 1, 1959  C. M. BALLARD  2,902,252
DISC VALVE
Filed July 30, 1956

Chennie M. Ballard
INVENTOR.

BY Robert Bahn 2,902,252
Patented Sept. 1, 1959

2,902,252
DISC VALVE
Chennie M. Ballard, Tulsa, Okla.

Application July 30, 1956, Serial No. 600,797

1 Claim. (Cl. 251—168)

The present invention relates to disc valves, and more particularly to that type of valve in which a pair of valve elements is movable so that the individual elements move toward or away from each other to open or close a valve, respectively.

It is an object of the present invention to provide a valve having inlet and outlet ports and valve elements movable simultaneously to close or open the ports.

Another object of the invention is the provision of a valve having axially aligned inlet and outlet ports, in which the valve elements are movable entirely out of line with the ports.

A further object of the invention is the provision of a valve having aligned inlet and outlet ports and movable elements for opening or closing the ports, in combination with means for assuring alignment of the elements with the ports.

A still further object of the invention is the provision of a valve having axially aligned inlet and outlet ports and valve elements rotatable into opening or closing position, in combination with means for preventing torsional displacement of the elements from their seats.

Yet another object of the invention is the provision of a valve having a valve seat and a valve disc rotatable into closing engagement with the seat, in combination with means for preventing grinding on the seat.

Finally, it is an object of the present invention to provide, a valve which will be simple and inexpensive to construct, easy to operate, install and repair, and rugged and durable in use.

Further objects and advantages of the invention will become apparent from a consideration of the following description, taken in conjunction with the accompanying drawing, in which.

Figure 1:
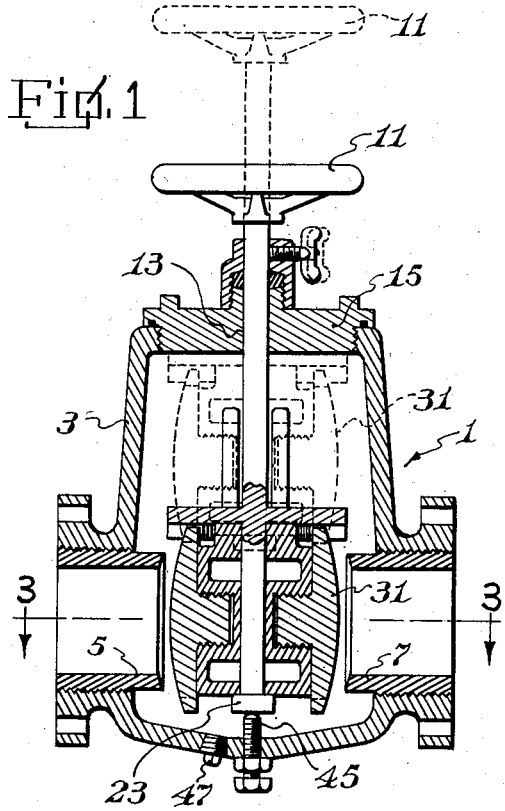
Figure 1 is an elevational cross-sectional view of a valve according to the invention, showing the valve elements or discs in open position.

Referring now to the drawings in greater detail, I have shown a disc valve generally indicated at 1, comprising a valve body 3 having inlet and outlet ports provided with axially aligned valve seats 5 and 7. A valve stem 9 is mounted for rotation and axial sliding movement in body 3 and has a hand wheel 11 at its upper end outside body 3. A hole 13 located in a screw-threadedly removable cap 15 accommodates sliding and rotative motion of stem 9. Cap 15 is of sufficient size that removal thereof permits removal of all the working parts within body 3. A collar nut 17 surrounds stem 9 and retains therein a packing gland 19. A locking thumbscrew 21 passing through nut 17 bears against stem 9 to lock stem 9 in any position of sliding or rotative adjustment.

Figure 3:
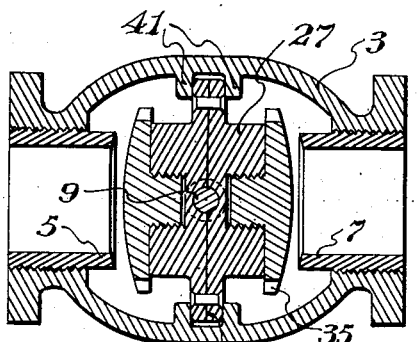
Figure 3 is a plan cross-sectional view taken on the line 3—3 of Figure 1.
Figure 4:
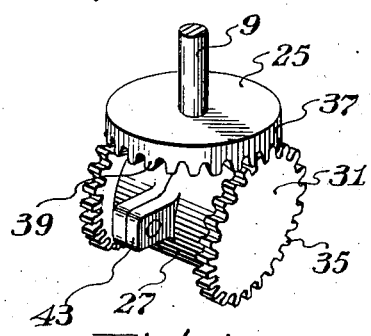
Figure 4 is a perspective view of the valve block and associated elements.

At the other or inner end of stem 9, an enlarged head 23 and a circular plate 25 maintain between them a valve block 27 which is journaled for rotation on stem 9 at one end thereof. As perhaps best seen in Figure 3, block 27 is formed of two identical halves riveted or otherwise fastened together.

On opposite sides of block 27 is located a pair of axially aligned, internally screw-threaded recesses 29. The screw threads of recesses 29 may be either both righthand threads or both lefthand threads; but they cannot be one lefthand and one righthand. In axial alignment with recesses 29 is a pair of valve elements comprising valve discs 31 having coaxial externally screw-threaded shanks 33 which have screw threads complementary to those of recesses 29 and are screw-threadedly received in recesses 29. Recesses 29 are shown as separate recesses the bottoms of which are spaced from each other; but they may alternatively comprise a single recess all the way through block 27.

Figure 2:
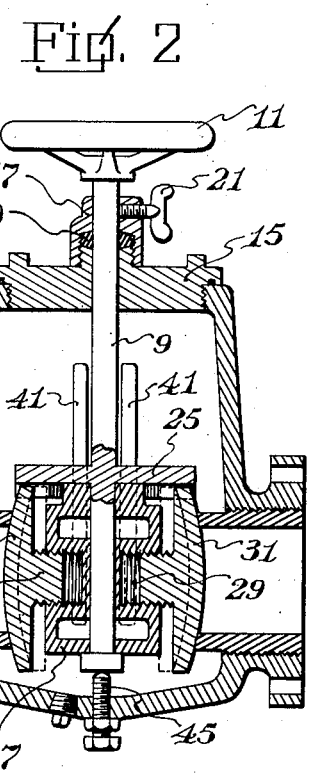
Figure 2 is a view similar to Figure 1 but showing the valve elements or discs in closed position.

Each valve disc 31 has a plurality of peripheral gear teeth 35; and plate 25 has on the side thereof adjacent block 27 an annular coaxial ring gear 37 in axial alignment with stem 9 and comprising a plurality of gear teeth 39 meshing with teeth 35. It will thus be obvious that rotation of stem 9 rotates the plate 25, ring gear 37 and gear teeth 39 together as a unit, to turn valve discs 31 in opposite directions relative to each other. It will also be apparent that rotation of valve discs 31 in opposite directions causes them to move bodily axially in opposite directions away from each other into sealing engagement with valve seats 5 and 7 to close the outlet and inlet ports, as shown in Figure 2, or toward each other to open the valve as shown in Figure 1.

Formed on opposite sides of the interior of valve body 3 are guideways 41 in which are disposed laterally extending projections integral with valve block 27 on opposite sides thereof, in the nature of lugs 43. As stated before, stem 9 is longitudinally slidable in hole 13; and may be slid up into the dotted line position of Figure 1 to remove the movable parts of the valve entirely from the fluid stream passing between seats 5 and 7. Moreover, when stem 9 is turned to open or close the valve with the parts as shown in Figure 2 or in full line in Figure 1, the assembly of guideways 41 and lugs 43 prevent misalignment of the working parts from torque. Thus, the assembly of guideways 41 and 43 performs the dual function of guiding sliding movement of the moving parts in a direction normal to the common axis of seats 5 and 7, and of preventing torsional misalignment of the working parts. Valve block 27 is slidable as a unit with stem 9 axially thereof; but when recesses 29 are axially aligned with seats 5 and 7 and stem 9 is rotated, block 27 will be held stationary by guideways 41 and lugs 43, with the result that a firm and accurately oriented base is provided for valve discs 31 so that they may seat true on seats 5 and 7.

In order to assure accurate alignment of recesses 29 and seats 5 and 7 upon downward sliding movement of the unitary assembly of stem 9 and block 27, a setscrew 45 is provided which screw-threadedly extends through body 3 and adjustably contacts head 23. A drain plug 47 is provided in the bottom of body 3 for draining the valve when desired.

Figure 5:
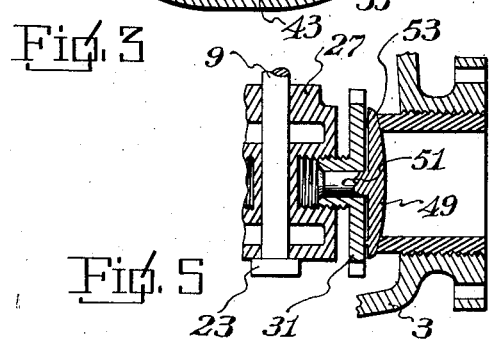
Figure 5 is a view similar to a portion of Figure 2 but showing a modified form of the invention.

As sometimes happens, it may be desirable to prevent grinding movement of the valve discs on their respective seats; and to this end, the structure comprising the modification of Figure 5 is provided, in which a valve face disc 49 is mounted freely rotatably in and coaxially of each valve disc 31. Each face disc 49 is mounted on the side of its associated valve disc 31 adjacent its associated valve seat. Each face disc 49 is carried in valve disc 31 by an axial stud 51 having locking engagement with the inner end of shank 33 to prevent axial displacement but permit relative rotation thereof. Each face disc 49 is provided on its inner side with an annular rib 53 of lesser area than the area of the associated seat 5 or 7, to insure that upon engagement of disc 49 with seat 5 or 7, disc 49 and seat 5 or 7 will remain stationary relative to each other and disc 49 and disc 31 will rotate relative to each other upon continued rotation of stem 9. Alternatively, rib 53 may be formed on the outer side of disc 31.

Thus, it will be obvious that I have achieved all of the initially recited objects of my invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

I claim:

A valve comprising a valve body having a pair of axially aligned valve seats, a valve stem mounted for rotation and axial sliding movement in the valve body, a unitary valve block movable within the valve body, one end of the valve stem being journaled for rotation in the valve block, a pair of axially aligned valve discs mounted for rotation on and relative to the valve block, each valve disc having a screw-threaded portion coaxial and rigid with the disc, the valve block having a pair of coaxially screw-threaded portions, the screw-threaded portion of a said valve disc being in screw-threaded engagement with each said screw-threaded portion of the valve block, each valve disc having peripheral gear teeth, a ring gear fixed on and coaxial with the valve stem and having gear teeth meshing with the peripheral gear teeth of both valve discs, and means confining movement of the valve block within the valve body to rectilinear movement relative to the valve body.

References Cited in the file of this patent

UNITED STATES PATENTS

| | | |
|---|---|---|
| 935,233 | Rothenbucher | Sept. 28, 1909 |
| 1,012,870 | Leitch | Dec. 26, 1911 |
| 1,462,636 | Edler | July 24, 1923 |
| 1,577,964 | Gilbert | Mar. 23, 1926 |
| 1,727,591 | Fridstein | Sept. 10, 1929 |
| 1,781,698 | O'Brien | Nov. 18, 1930 |